United States Patent
Jadav et al.

(10) Patent No.: US 11,962,953 B2
(45) Date of Patent: *Apr. 16, 2024

(54) TRANSMITTING FUNCTIONAL SAFETY STATISTICS VIA TRANSMITTED VIDEO

(71) Applicant: TEXAS INSTRUMENTS INCORPORATED, Dallas, TX (US)

(72) Inventors: Brijesh Rameshbhai Jadav, Bangalore (IN); Shiju Ozhuvinamolathu Sivasankaran, Bangalore (IN); Anish Reghunath, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 120 days.

This patent is subject to a terminal disclaimer.

(21) Appl. No.: 17/194,938

(22) Filed: Mar. 8, 2021

(65) Prior Publication Data

US 2021/0195156 A1 Jun. 24, 2021

Related U.S. Application Data

(63) Continuation of application No. 15/851,351, filed on Dec. 21, 2017, now Pat. No. 10,944,950.

(51) Int. Cl.
*H04N 7/18* (2006.01)
*G07C 5/02* (2006.01)
(Continued)

(52) U.S. Cl.
CPC ........... *H04N 9/8205* (2013.01); *H04L 65/75* (2022.05); *H04L 65/762* (2022.05); *H04N 5/77* (2013.01);
(Continued)

(58) Field of Classification Search
CPC .. H04N 9/82; H04N 7/18; H04N 9/64; H04N 15/77; H04L 29/06; G07C 5/02; B60W 30/12; B60W 50/029
See application file for complete search history.

(56) References Cited

U.S. PATENT DOCUMENTS

| | | | |
|---|---|---|---|
| 5,381,338 A | 1/1995 | Wysocki et al. | |
| 5,903,454 A | 5/1999 | Hoffberg et al. | |

(Continued)

FOREIGN PATENT DOCUMENTS

| | | |
|---|---|---|
| CN | 102223487 A | 10/2011 |
| CN | 107277445 A | 10/2017 |
| JP | 2013020417 A | 1/2013 |

OTHER PUBLICATIONS

_ Evaluating Functional Safety in Automotive Image Sensors; May 2018; (Year: 2018).*

(Continued)

*Primary Examiner* — Luis Perez-Fuentes
(74) *Attorney, Agent, or Firm* — Michael T. Gabrik; Frank D. Cimino

(57) ABSTRACT

Systems and methods are provided for transmitting functional safety statistics within a system. A video source produces a video data stream. A functional safety system driver accumulates functional safety statistics from at least one system and writes the functional safety statistics onto an associated system memory. A display sub-system driver writes a frame of the video data stream to the system memory. The display sub-system driver formats the functional safety statistics as video data and appends the functional safety statistics to a portion of the frame of video that is reserved for the functional safety statistics. A display sub-system transmits the frame of the video data stream to a host processor, which extracts the functional safety statistics from the video frame.

20 Claims, 2 Drawing Sheets

(51) Int. Cl.
*H04L 65/75* (2022.01)
*H04N 5/77* (2006.01)
*H04N 9/64* (2023.01)
*H04N 9/82* (2006.01)

(52) U.S. Cl.
CPC ............... *H04N 7/183* (2013.01); *H04N 9/64* (2013.01); *G07C 5/02* (2013.01)

(56) References Cited

U.S. PATENT DOCUMENTS

| | | | | |
|---|---|---|---|---|
| 8,046,313 | B2 * | 10/2011 | Hoffberg | H04N 21/252 706/14 |
| 9,007,197 | B2 * | 4/2015 | Breed | G01S 17/08 340/436 |
| 9,177,477 | B2 * | 11/2015 | Mochizuki | G08G 1/162 |
| 9,224,293 | B2 | 12/2015 | Taylor | |
| 9,266,473 | B1 * | 2/2016 | Elwell | H04W 4/48 |
| 10,007,269 | B1 * | 6/2018 | Gray | G06F 18/2415 |
| 10,315,648 | B2 | 6/2019 | Sherony | |
| 10,940,868 | B2 * | 3/2021 | Asakura | B60W 50/029 |
| 10,944,950 | B2 * | 3/2021 | Jadav | H04L 65/75 |
| 11,303,806 | B2 * | 4/2022 | Appia | B60R 1/00 |
| 11,436,171 | B2 * | 9/2022 | Reghunath | G06F 3/14 |
| 2009/0096600 | A1 * | 4/2009 | Tsubooka | G06F 3/14 340/461 |
| 2009/0187300 | A1 | 7/2009 | Everitt et al. | |
| 2012/0050074 | A1 | 3/2012 | Bechtel et al. | |
| 2013/0018547 | A1 | 1/2013 | Ogata et al. | |
| 2017/0144585 | A1 | 5/2017 | Ogawa | |
| 2017/0144587 | A1 | 5/2017 | Ogawa | |

OTHER PUBLICATIONS

Color gamut scalable video coding; Jan. 2013; (Year: 2013).*
Image color conversion; 2010; (Year: 2010).*
Chinese Office Action for Chinese Application No. 2018115222347; dated Sep. 18, 2021.
ON Semiconductor: Evaluating Functional Safety in Automotive Image Sensors; May 2018; (Year: 2018); 13 pages. REF6.
Color gamut scalable video coding; Joint Collaborative Team on Video Coding (JCT_VC) Document: JCTVC-L0334; Jan. 2013; (Year 2013) REF2.
Image Color Conversion; 2010; http://software.intel.com/sites/products/documentation/phc/ipp/ippi/ippi: (Year; 2010) 9 pages. REF4.
NPL Google Search; Oct. 30, 2020; (embedding) + (data video) + (graphic) + (FSS or safety) + (statistic OR histogra) (Year: 2020) 2 pages. REF 11.
Google Search: (safety environmental) + (car OR vehicle) + statistic OR information OR; May 31, 2019; 2 pages. REF 3.
COMPSCI708S1T: CBIR: Colour Features; http://www.cs.auckland.ac.nz/compsci708s1c/lectures/Gleet-html/topic3 . . . . Jun. 6, 2019; 17 pages. REF1.

* cited by examiner

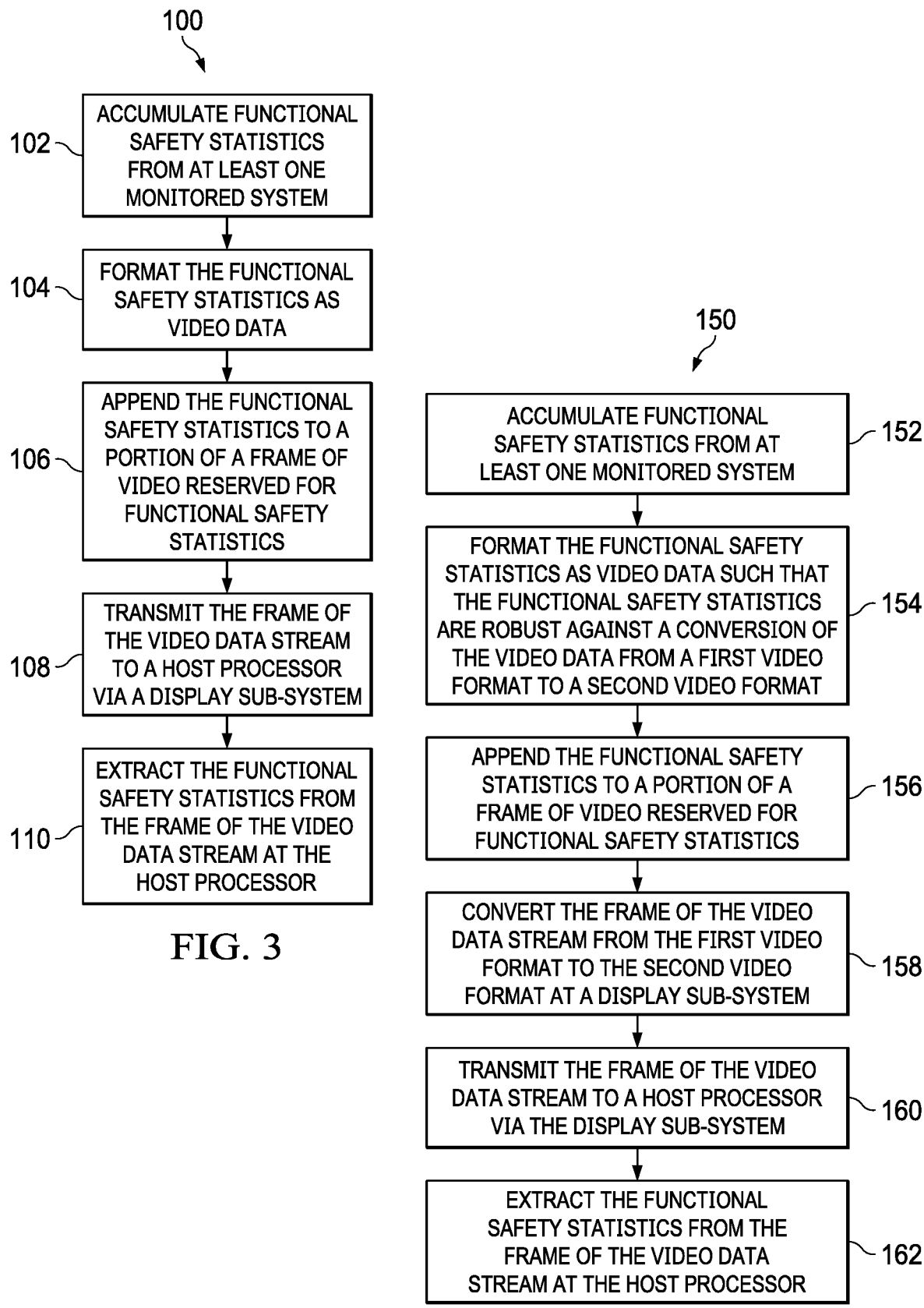

TRANSMITTING FUNCTIONAL SAFETY STATISTICS VIA TRANSMITTED VIDEO

CROSS-REFERENCE TO RELATED APPLICATIONS

This application is a continuation of U.S. patent application Ser. No. 15/851,351, filed Dec. 21, 2017, which is incorporated by reference herein in its entirety.

FIELD OF THE INVENTION

The invention relates generally to communications systems, and more specifically, to systems and methods for transmitting functional safety statistics via transmitted video.

BACKGROUND OF THE INVENTION

Functional safety is the part of the overall safety of a system or piece of equipment that depends on the system or equipment operating correctly in response to its inputs, including the safe management of likely operator errors, hardware failures and environmental changes. One of the key requirements for functional safety is to monitor each safety system and system-critical device to ensure that they perform correctly and as expected. Typically, functional safety is verified and checked on an external device, acting as a host device, by gathering statistics from a client device.

SUMMARY OF THE INVENTION

In accordance with an aspect of the present invention, a system is provided. A video source produces a video data stream. A functional safety system driver accumulates functional safety statistics from at least one system and writes the functional safety statistics onto an associated system memory. A display sub-system driver writes a frame of the video data stream to the system memory. The display sub-system driver formats the functional safety statistics as video data and appends the functional safety statistics to a portion of the frame of video that is reserved for the functional safety statistics. A display sub-system transmits the frame of the video data stream to a host processor, which extracts the functional safety statistics from the video frame In accordance with another aspect of the present invention, a method is provided. Functional safety statistics are accumulated from at least one monitored system. The functional safety statistics are formatted as video data. The functional safety statistics are appended to a portion of a frame of video reserved for functional safety statistics. The frame of the video data stream is transmitted to a host processor via a display sub-system. The functional safety statistics are extracted from the video frame at the host processor.

In accordance with still another aspect of the present invention, a method is provided for transmitting functional safety statistics within an automobile. Functional safety statistics are accumulated from at least one automotive system within the automobile. A frame of video is acquired at a camera of the automobile. The functional safety statistics are formatted as video data, such that the functional safety statistics are robust against a conversion of the video data from a first video format to a second video format. The functional safety statistics are appended to a portion of the frame of video reserved for functional safety statistics. The frame of the video data stream is converted from the first video format to the second video format at a display sub-system. The frame of the video data stream is transmitted to a host processor via the display sub-system. The functional safety statistics are extracted from the frame of the video data stream at the host processor.

BRIEF DESCRIPTION OF THE DRAWINGS

The features, objects, and advantages of the invention will become more apparent from the detailed description set forth below when taken in conjunction with the drawings, wherein:

FIG. 3 illustrates an example of a method for transmitting functional safety statistics via a display link; and FIG. 4 illustrates a method for transmitting functional safety statistics within an automobile.

DETAILED DESCRIPTION OF THE INVENTION

Functional safety is about ensuring the safe operation of systems even when they go wrong. As part of functional safety, it is desirable that the different events within an embedded system on a chip (SoC) or other system, which may or may not indicate the presences of a fault, are logged and provided to a safety supervisor system, which can then determine the health of the system and ensure it is still safe. Such logged information is referred to herein as Functional Safety Statistics (FSS). The safety supervisor system mentioned above can be present within the monitored system or located outside the monitored system. In cases where the supervisor system sits outside the monitored system, the functional safety statistics data can be transferred to the safety supervisor system in a reliable and robust manner.

In some applications, for example, in automotive systems, the monitored system may coexist with one or more video systems in a single embedded system. Such a system may include a display sub-system (DSS), which provides a high bandwidth interface to a system memory (e.g., a double data rate (DDR) memory) as well as to other portions of the system or a host processor external to the system, via the DSS output. Since the display needs to be updated continuously, the data provided by the DSS is already a high priority at the embedded system and is controlled by a real-time software driver.

According to this disclosure, the presence of the display sub-system can be exploited by transferring functional safety statistics data interleaved with the video and graphics data. Specifically, the systems and methods presented herein encode functional safety statistics data in the video frame itself in a reliable and robust manner and then extract the functional safety statistics from the video data on the receiving side at a host processor. As a result, the functional safety statistics data can be provided to the host processor expediently without significant additional overhead.

Figure 1:
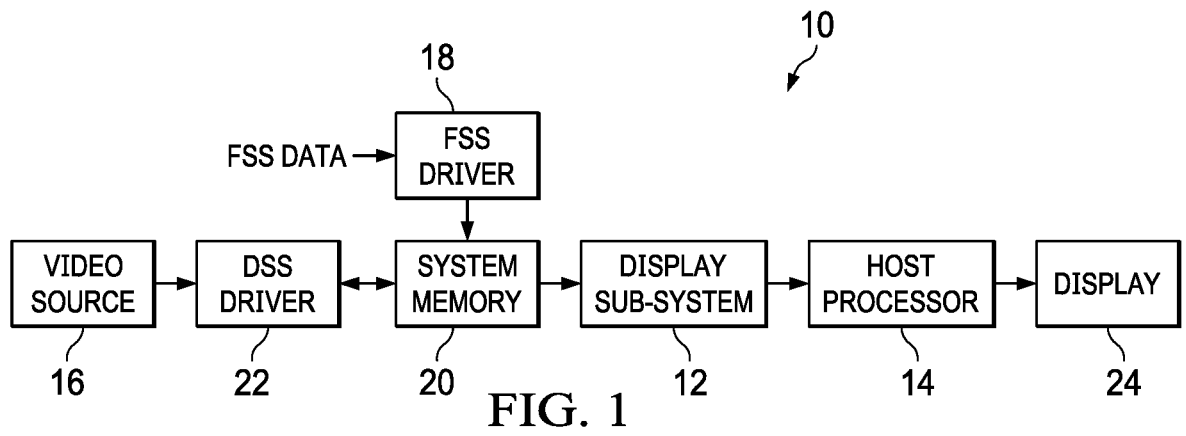
FIG. 1 illustrates a system utilizing a display sub-system to provide functional safety statistics data to a host processor.

FIG. 1 illustrates a system 10 utilizing a display sub-system 12 to provide functional safety statistics data to a host processor 14. A video source 16 produces a video data stream. For example, the video source 16 can include a camera, a CPU/GPU within the system that generates video frames, or a memory storing video content preloaded in the memory through WiFi or Ethernet. A functional safety system driver 18 accumulates functional safety statistics from at least one system and writes the functional safety statistics to the system memory 20. A display sub-system driver 22 reads the functional safety statistics from the system memory 20 and writes a frame of the video data stream to the system memory 20, formatting the functional safety statistics as video data and appending the functional safety statistics to a portion of the frame of video that is reserved for the functional safety statistics. The display sub-system 12 transmits the video frame to the host processor 14, which extracts the functional safety statistics from the video frame.

In one implementation, formatting the functional safety statistics can include altering the data such that the functional safety statistics is robust against transformations of the data. For example, the video data may be captured originally in an RGB format, but transferred into a YUV format at the display sub-system 12 before transmission. This conversion can introduce quantization errors into one or more least significant bits in the video data. As a result, the functional safety statistics can be written at the system memory 20 such that none of the data is stored within the least significant bits. In another implementation, the data can be converted from a YUV 444 format to a YUV 422 format at the display subsystem, which requires downsampling of the data. To avoid loss of data, the functional safety statistics can be upsampled prior to appending the functional safety statistics into the video frame.

In one implementation, the frame of video is provided directly to a display 24, with the functional safety statistics still embedded within the video. It will be appreciated that this can cause a couple of lines of distortion within the video feed, but it allows for a simplified implementation of the host processor 14. In the illustrated implementation, the host processor 14 extracts the functional safety statistics from the video frame to produce both a stream of functional safety statistics and a video stream in which the functional safety statistics data has been removed. Accordingly, a clean video feed can be provided at the cost of a more complex host processor 14.

Figure 2:
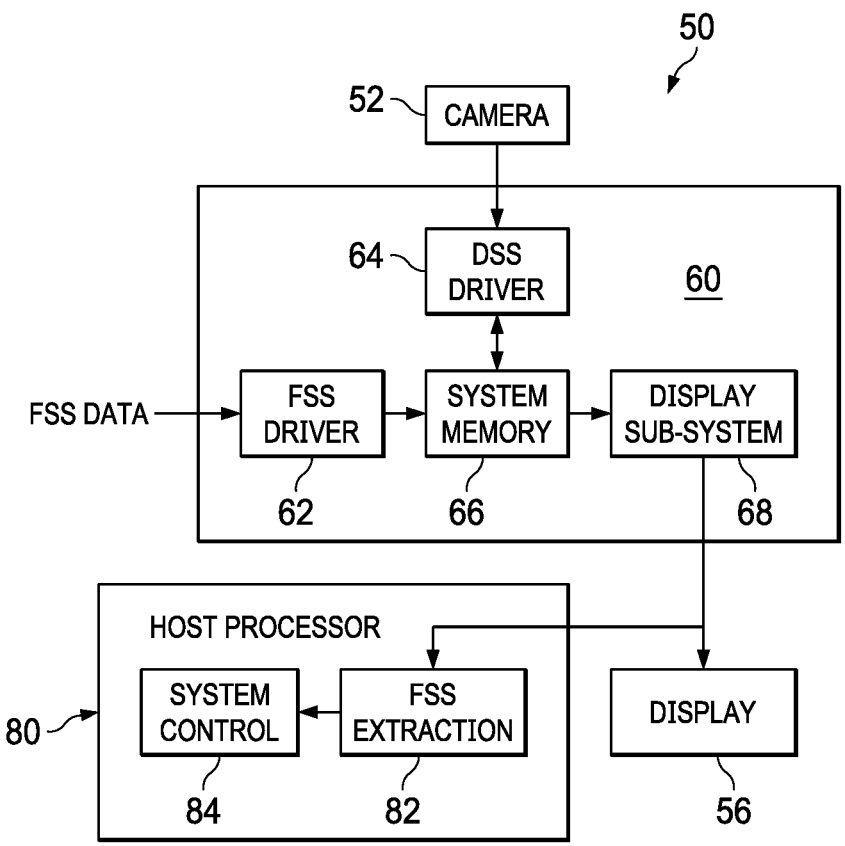
FIG. 2 illustrates one implementation of a system that transmits functional safety statistics data from a system on a chip (SoC) to a host processor.

FIG. 2 illustrates one implementation of a system 50 that transmits functional safety statistics data from a system on a chip (SoC) 60 to a host processor 80. In the illustrated implementation, the system 50 is implemented in an automobile, and the functional safety statistics can include safety parameters such as frame counters, frame rates, frame latency, performance numbers, the speed of the moving car, metadata to enable augmented reality on a head unit, and other such values. It will be appreciated, however, that the invention can be applied in any of a number of systems for which prompt reporting of safety statistics is desirable, such as industrial systems.

Given the importance of safety statistics, it is desirable that they be provided to the host processor 80 in real time. Currently, in many implementations, an inter-integrated circuit interface or a serial peripheral interface is used to send functional safety statistics information to the external device, but the amount of data that can be transferred is limited, the interfaces are typically slow, and synchronizing these interfaces with the data pipeline is very difficult.

Automotive chips will have a display sub-system (DSS) which is used for displaying video and graphics data to external devices. The display sub-system provides a high bandwidth interface to a system memory, as well as to an external host via a display sub-system output. The display also needs to be updated real-time, so the display sub-system is already a high priority master in the system on a chip and is controlled by a real-time driver. This high bandwidth connection can be exploited by reserving a few lines in each video frame, converting the functional safety statistics into a video format, embedding functional safety statistics in video frame itself, and extracting the functional safety statistics from the video frame at the host processor.

To this end, the system on a chip 60 includes a functional safety statistics (FSS) driver 62 that receives functional safety statistics data from a plurality of automotive systems. A display sub-system (DSS) driver 64 receives video frames from a camera 52 associated with the automobile. For example, the camera 52 can be implemented as a camera in the automobile. In one implementation, each of the display sub-system driver 64 and the functional safety statistics driver can be implemented as software or firmware instructions executed by a processor (not shown) on the system on a chip 60. The functional safety statistics driver 62 writes the received functional safety statistics into the system memory 66. The display sub-system driver 64 retrieves the functional safety statistics from the system memory 66 and appends the functional safety statistics to the video frame. The altered video frame is then written to the system memory 66.

In the illustrated implementation, the video frames captured at the camera 52 are captured in an RGB format, but the data is transformed at the display sub-system 68 into a YUV 422 format for transmission. The RGB to YUV conversion, as well as the reverse YUV to RGB conversion at the host processor 80 to retrieve the functional safety statistics, introduces quantization bit errors in the least significant bits which are transmitted. As a result, the display sub-system driver 64 can avoid writing the functional safety statistics within one or more least significant bits in each word of the video frame. A YUV444 to YUV422 conversion at the display sub-system 68 results in down-sampling of the incoming data and corresponding information loss. To avoid this, display sub-system driver 64 can up-sample the functional safety statistics before being sent to the display sub-system 68.

In another implementation, the camera 52 captures video frames in a YUV 422 format, but the data is transformed at the display sub-system 68 into an RGB format for transmission. In this implementation, the chroma component is up-sampled inside the display sub-system 68, using a scaling engine, before conversion to RGB. This chroma conversion can corrupt the functional safety statistics data, and to avoid errors due to chroma up-sampling, only the luma component is used for transferring the functional safety statistics. The chroma component within the portion of the frame reserved for functional safety statistics is transferred with a fixed 0x80 value. Here again, color space conversion can introduce bit errors, so the two least significant bits of each component of the luma is left unused and N most significant bits are used, where N is a positive integer greater than one.

In still another implementation, the camera 52 can capture a YUV 422 or YUV 420 input and the video data can be transmitted as YUV 444. Accordingly, the display sub-system 68 up-samples the chroma component from to a YUV444 format, and the host processor 80 can down-sample the chroma component to a YUV422 format. This chroma conversion can corrupt the functional safety statistics appended to the video, so only the luma component is used for transfer of the functional safety statistics data, and too avoid quantization errors, the two least significant bits of each component of the luma is left unused.

It will be appreciated that, in some implementations, the video format will not change, and no alteration of the functional safety statistics, beyond any formatting necessary to adapt them to the video frame, will be utilized. In such a case, the functional safety statistics can be directly copied into the video frame and can be extracted in the host processor 80 without any conversion.

At the host processor 80, an extraction component 82 extracts the functional safety statistics from the video frame and converts them from the video format. The functional safety statistics are then provided to a system control 84 that evaluates the functional safety statistics and takes remedial action if the functional safety statistics are outside of a desired range. Examples of remedial actions include providing a warning message to the driver, resetting the client system, or changing an automated system in a vehicle or other piece of machinery, such as an industrial robot, to manual control. In the illustrated implementation, the video is provided directly to a display 56, in parallel with the host processor 80, and the portion of the display reserved for the functional safety statistics is retained in the video data, leading to minor artifact in the video. In an alternative implementation, the host processor 80 can also extract a copy of the video frame that does not include the portion of the frame reserved for the functional safety statistics and provide this clean video for use at the display 56.

In the illustrated system 50, functional safety statistics can be transferred in real time along with the display frame, eliminating the need for extra data interfaces for functional safety statistics transfer and allowing for a faster, more robust data transfer relative to existing implementations. Typically, the size of the display will exceed a megapixel and frame rates can be between thirty and sixty hertz, allowing a significant amount of functional safety statistics data to be transferred by just reserving even one or two lines in the video frame. Where this is implemented in an existing system, it can free up existing dedicated interfaces formerly used for functional safety statistics for other purposes.

In view of the foregoing structural and functional features described above in FIGS. 1 and 2, example methods will be better appreciated with reference to FIGS. 3 and 4. While, for purposes of simplicity of explanation, the methods of FIGS. 3 and 4 are shown and described as executing serially, it is to be understood and appreciated that the present invention is not limited by the illustrated order, as some actions could in other examples occur in different orders and/or concurrently from that shown and described herein.

FIG. 3 illustrates an example of a method 100 for transmitting functional safety statistics via a display link. At 102, functional safety statistics are accumulated from at least one monitored system. At 104, the functional safety statistics are formatted as video data. For example, the functional safety statistics can be written in a format compatible with video frames provided by an associated video source. At 106, the functional safety statistics are appended to a portion of a frame of video reserved for functional safety statistics. At 108, the frame of the video data stream is provided to a host processor via a display sub-system, and the functional safety statistics are extracted from the video frame at the host processor at 110. In one example, remedial action can be taken at a monitored system in response to the functional safety statistics if they deviate from desired ranges. It will be appreciated that the frame can be provided to a display either in parallel with the host processor, or the host processor can process the received video to provide a clean frame of video that does not contain the functional safety statistics and provide the clean frame of video to the display.

In one implementation, the frame of the video data stream is converted from a first video format to a second video format at the display subsystem. In this case, formatting the functional safety statistics as video data at 104 can include formatting the functional safety statistics such that the functional safety statistics are robust against a conversion of the video data from the first video format to the second video format. For example, if the first video format is an RGB format and the second video format is a YUV 422 format, the functional safety statistics can be written only in N most significant bits of each word within the portion of a frame of video reserved for functional safety statistics, where N is a positive integer greater than one, as quantization errors in the least significant bits can occur during the conversion. Similarly, the functional safety statistics can be upsampled to ensure that no data is loss when the video data is downsampled in the conversion to the YUV 422 format.

In another example, the first video format is a YUV 422 format and the second video format is one of an RGB format and a YUV 444 format. In such a case, formatting the functional safety statistics at 104 can include writing the functional safety statistics only in N most significant bits of each word within a luma component of the portion of a frame of video reserved for functional safety statistics. This allows the data to be preserved during the resampling of the chroma values and avoids quantization errors in the least significant bits. It will be appreciated that, where video conversion has taken place, during the extraction at 110, the extracted functional safety statistics are converted back to the original format. Accordingly, the functional safety statistics are formatted at 104 to be robust against each of the original conversion as well as the reversion to the original format.

FIG. 4 illustrates a method 150 for transmitting functional safety statistics within an automobile. At 152, functional safety statistics are accumulated from at least one automotive system within the automobile. A frame of video is acquired at a camera of the automobile at 154. At 156, the functional safety statistics are formatted as video data, such that the functional safety statistics are robust against a conversion of the video data from a first video format to a second video format. This formatting can include, for example, upsampling the functional safety statistics, writing the functional safety statistics only in a luma component within a video frame, or writing the functional safety statistics only in N most significant bits of each word in the video frame, where N is a positive integer greater than one.

At 158, the functional safety statistics are appended to a portion of the frame of video reserved for functional safety statistics. At 160, the frame of the video data stream is converted from the first video format to the second video format at a display sub-system. At 162, the frame of the video data stream is provided to a host processor via the display sub-system, and the functional safety statistics from the video frame are extracted at the host processor at 164. As mentioned previously, the extraction process can include converting the functional safety statistic data back into the first video format.

The invention has been disclosed illustratively. Accordingly, the terminology employed throughout the disclosure should be read in an exemplary rather than a limiting manner. Although minor modifications of the invention will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

Having described the invention, we claim:

1. A system comprising:
   a safety statistics driver configured to receive event data pertaining to operation of an associated element;
   a display subsystem configured to:
      receive video data that includes a frame, wherein the video data is received in a first video format;
      write the event data into a portion of the frame such that the event data is unmodifiable during conversion of the video data from the first video format to a second video format; and
      convert the video data from the first format to the second format; and
   a processor configured to:
      extract the event data from the video data in the second format; and
      evaluate a safety statistic related to operation of the associated element in the event data to determine to take a safety-related action with respect to operation of the associated element.

2. The system of claim 1, wherein:
   the first video format is an RGB format;
   the second video format is a YUV format; and
   the portion of the frame in which the event data is written is a set of most significant bits of the frame.

3. The system of claim 1, wherein:
   the first video format is a YUV format that includes a luma component and a chroma component;
   the second video format is an RGB format; and
   the portion of the frame in which the event data is written is the luma component.

4. The system of claim 1, wherein:
   the first video format and the second video format are from a group consisting of YUV 422, YUV 420, and YUV 444; and
   the portion of the frame in which the event data is written is a luma component.

5. The system of claim 1, wherein the display subsystem includes a display driver and a display interface coupled to the display driver, the display interface configured to:
   receive the video data that includes the event data;
   convert the video data that includes the event data to the second video format; and
   provide the video data that includes the event data in the second video format.

6. The system of claim 5, wherein the display driver is configured to receive the video data, including the frame, in the first video format; and write the event data into the portion of the frame such that the event data is unmodifiable during conversion of the video data from the first video format to the second video format.

7. The system of claim 6, wherein the processor is further configured to:
   remove the event data from the video data in the second format; and
   provide the video data in the second format with the event data removed for display.

8. The system of claim 5, further including a display coupled to the display interface.

9. The system of claim 8, wherein the display is configured to display the video data including the event data in the second format.

10. The system of claim 1, wherein the display subsystem is configured to upsample the event data prior to writing the event data into the portion of the frame.

11. The system of claim 1, further including a memory coupled to the safety statistics driver and the display driver, wherein:
   the safety statistics driver is configured to write the event data into the memory; and
   the display subsystem is configured to:
      read the event data from the memory; and
      write the video data that includes the event data to the memory.

12. The system of claim 1, wherein:
   the frame includes a line reserved for the event data; and
   the portion of the frame in which the set of event data is written is the reserved line.

13. A method comprising:
   receiving event data pertaining to operation of a system;
   receiving video data in a first video format;
   writing the event data in a portion of the video data that is unmodifiable during conversion from the first video format to a second video format;
   converting the video data that includes the event data to the second video format, the event data being unmodified during the converting;
   providing the video data that includes the event data in the second video format;
   determining, based on a safety statistic in the video data, whether to take a safety-related action with respect to operation of the associated system, wherein the safety statistic is related to operation of the system; and
   resetting the system in a response to a determination to take the safety-related action.

14. The method of claim 13, wherein:
   the first video format is an RGB format;
   the second video format is a YUV format; and
   the portion of the video data in which the event data is written is a set of most significant bits.

15. The method of claim 13, wherein:
   the first video format is a YUV format that includes a luma component and a chroma component;
   the second video format is an RGB format; and
   the portion of the video data in which the event data is written is the luma component.

16. The method of claim 13, wherein:
   the first video format and the second video format are from a group consisting of YUV 422, YUV 420, and YUV 444; and
   the portion of the video data in which the event data is written is a luma component.

17. The method of claim 13, further including upsampling the event data prior to the writing of the event data in the portion of the video data.

18. The method of claim 13, further including extracting the event data from the video data in the second video format.

19. The method of claim 13, further including displaying the video data that includes the event data.

20. A system comprising:
   a memory;
   a safety statistics driver coupled to the memory and configured to receive vehicle event data pertaining to operation of an associated vehicle and to write the vehicle event data to the memory;
   a display subsystem coupled to the memory and configured to:
      receive video data in a first video format;
      read the vehicle event data from the memory;

write the vehicle event data into a portion of the video data such that the vehicle event data is unmodifiable during conversion from the first video format to a second video format; and write the video data that includes the vehicle event data in the memory;

a display interface coupled to the memory and configured to:

read the video data that includes the vehicle event data from the memory;

convert the video data that includes the vehicle event data from the first video format to the second video format in which the vehicle event data is unmodified; and provide the video data in the second video format including the unmodified vehicle event data; and a processor coupled to the display interface and configured to:

determine whether to take a safety-related action with respect to operation of the associated vehicle based on a safety statistic in the event data, wherein the safety statistic is related to operation of the associated vehicle; and in response to a decision to take the safety-related action, change an automated system in the associated vehicle to manual control.

* * * * *